United States Patent
Tsirkin (10) Patent No.: US 10,949,243 B2
(45) Date of Patent: Mar. 16, 2021

(54) REDUCING IPI OVERHEAD WITH CPU OVERCOMMIT SUPPORT VIA IPI BROADCAST

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 16 days.

(21) Appl. No.: 16/395,874

(22) Filed: Apr. 26, 2019

(65) Prior Publication Data

US 2020/0341792 A1 Oct. 29, 2020

(51) Int. Cl.
*G06F 9/455* (2018.01)
*G06F 9/48* (2006.01)

(52) U.S. Cl.
CPC ........ *G06F 9/45558* (2013.01); *G06F 9/4812* (2013.01); *G06F 2009/45575* (2013.01)

(58) Field of Classification Search
None
See application file for complete search history.

(56) References Cited

U.S. PATENT DOCUMENTS 8,706,941 B2 4/2014 Serebrin et al.

OTHER PUBLICATIONS

Wassen et al., "Suppressing Jitter by Isolating Bare-Metal Tasks within a General-Purpose OS on x86 NUMA Systems," 2016, 324 pgs.
Li, Wanpeng, "Torwards a more Scalable KVM Hypervisor," 2018, 19 pgs.

*Primary Examiner* — Gregory A Kessler
(74) *Attorney, Agent, or Firm* — Lowenstein Sandler LLP (57) ABSTRACT

Systems and methods for IPI overhead reduction with overcommit support are disclosed. In one implementation, a hypervisor running on a host computer system may detect an inter-processor interrupt (IPI) associated with a first virtual processor of a plurality of virtual processors of a virtual machine running on the host computer system. The hypervisor may send the IPI to the plurality of virtual processors. Responsive to determining that at least one virtual processor of the plurality of virtual processors is in an active state, the hypervisor may cause the plurality of virtual processors to stay in a guest execution mode. Additionally, responsive to determining that all virtual processors of the plurality of virtual processors entered an idle state, the hypervisor may cause the plurality of virtual processors to exit the guest execution mode.

20 Claims, 7 Drawing Sheets

REDUCING IPI OVERHEAD WITH CPU OVERCOMMIT SUPPORT VIA IPI BROADCAST

TECHNICAL FIELD

The present disclosure is generally related to virtualized computer systems, and more particularly, reducing inter-processor interrupt (IPI) overhead with CPU overcommit support via IPI broadcast.

BACKGROUND

Virtualization may be viewed as abstraction of some physical components into logical objects in order to allow running, for example, various operating systems concurrently and in isolation from other operating systems on one or more interconnected physical computer systems. Virtualization allows, for example, consolidating multiple physical servers into one physical server running multiple virtual machines in order to improve the hardware utilization rate. Virtualization may be achieved by running a layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

One of the main sources of overhead for virtualization is handling interrupts, in particular, handling inter-processor interrupts (IPIs).

Interrupts and exceptions are events that indicate that a condition exists in the system, the processor, or within the currently executing task that requires attention of a processor. They typically result in a forced transfer of execution flow from the currently running task to a special code fragment (also referred to as an interrupt handler or an exception handler). The action taken by the processor in response to an interrupt or exception is referred to as servicing or handling the interrupt or exception. Interrupts occur at random times during the execution of a program, e.g., in response to signals from physical devices (e.g., requests to service peripheral devices). Software can also generate interrupts by executing the INT n instruction.

Interrupts may be processed by one or more interrupt controllers such as Advanced Programmable Interrupt Controllers (APICs), including one local APIC per processor and one or more input/output (I/O) APICs connected to I/O devices. An interrupt may be addressed to any subset of processors within the system. In a computer system running one or more virtual machines, interrupts may be virtualized by the hypervisor identifying one or more virtual processors for servicing an outstanding interrupt and routing (or injecting) the interrupt message to the identified virtual processors (also referred to as virtual central processing units (vCPU)). Injectable interrupts include external interrupts, non-maskable interrupt (NMI), processor exceptions, software generated interrupts, system management interrupts, initialization interrupts, reset interrupts and software traps.

Each local APIC comprises a set of APIC registers and associated hardware that controls the delivery of interrupts to the processor core and the generation of inter-processor interrupt (IPI) messages. The APIC registers are memory mapped and may be read and written to using an appropriate processor instruction (e.g., MOV).

Certain processor architectures support inter-processor interrupts (IPI) to provide a mechanism to interrupt another processor or group of processors on the system bus. IPIs may be used for software self-interrupts, interrupt forwarding, or preemptive scheduling.

In a computer system running one or more virtual machines, interrupts may be virtualized by the hypervisor identifying one or more virtual processors for servicing an outstanding interrupt and routing (or injecting) the interrupt message to the identified virtual processors. Injectable interrupts include external interrupts, non-maskable interrupt (NMI), processor exceptions, software generated interrupts, system management interrupts, initialization interrupts, reset interrupts and software traps.

Certain processor architectures support virtualization by providing special instructions for facilitating virtual machine execution. In certain implementations, a processor may support executing a virtual machine monitor (VMM) that acts as a host and has full control of the processor and other platform hardware. A VMM presents a virtual machine with an abstraction of one or more virtual processors. A VMM is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the VMM can retain control of platform resources. A transition from the reduced privilege level (also referred to as VMX non-root operation in certain processor architectures) to the VMM context is referred to as a VM exit and may be performed by invoking a special Instruction Set Architecture (ISA)-dependent instruction (e.g., VMCALL).

In certain implementations, in order to send an IPI message to another processor, the origin vCPU should perform a VM exit to transition to a privileged execution mode. Furthermore, sending an IPI to a vCPU which is running in an idle state may require the hypervisor to cause the receiving vCPU to perform a VM exit in order to "wake up" the receiving vCPU (i.e., force the receiving vCPU to transition to an active state). A VM exit herein shall refer to a transition from an unprivileged guest execution mode within the VM to the privileged virtual machine extension (VMX) root execution mode in response to detecting one of the triggering events (such as an attempt to execute a certain privileged instruction or to access a certain memory address). Performing a VM exit increases the execution latency in the virtualized environment because of the need to rebuild the vCPU context in the guest mode upon each reentry into that mode.

A common approach to reduce this latency is to keep in the active state all vCPUs running in the guest execution mode, thus allowing the vCPUs to send IPIs to each other via memory monitoring which may be performed, e.g., using x86-64 MONITOR/MWAIT instructions, their analogs on other execution platforms, or other memory access instructions, as described in more detail herein below. However, the above-described approach of reducing latency by keeping all the vCPUs of a VM running within the guest mode would fail if this approach is applied in a CPU overcommit virtualized environment. CPU overcommit may be found when more than one vCPU is assigned to a single physical CPU. Each vCPU may be implemented by a respective processing thread that may be scheduled to run on one of the host CPUs. In an illustrative example, a first VM with two vCPUs (vCPU1 and vCPU2) and a second VM with two vCPUs (vCPU3 and vCPU4) may be running concurrently on a host with two physical CPUs (hCPU1 and hCPU2). If VM1 started first on the host, then the processing thread implementing vCPU1 would be running on hCPU1 and the processing thread implementing vCPU2 would be running on hCPU2. Under the above-described approach, vCPU1 and vCPU2 may stay in the guest mode without making a VM exit for an extended period of time, resulting in significant delays or failure to run the vCPUs of VM2 on the same host because the execution control would not be transferred back to the hypervisor even when vCPU1 and vCPU2 are idle. Thus vCPU3 and vCPU4 may not get a chance to take turn running on the host CPUs.

The systems and methods of the present disclosure alleviate these and other deficiencies of conventional implementations, by providing a method for reducing IPI overhead with CPU overcommit support via IPI broadcast. In accordance with one or more aspects of the present disclosure, the hypervisor may detect an IPI received by a physical CPU and may map the received IPI to a vCPU of a VM running on the host system for processing. In one implementation, the hypervisor then may broadcast the IPI to at least a subset of the vCPUs associated with the VM, thus waking up all these vCPUs. While at least one vCPU of the subset of the vCPUs running in an active state, the hypervisor may prevent the other vCPUs from exiting to the hypervisor, thus forcing all the vCPUs to remain in the guest execution mode.

While in the guest execution mode, each vCPU may perform memory monitoring (e.g., using x86-64 MONITOR/MWAIT instructions, their analogs on other execution platforms, or other memory access instructions) in order to receive notifications of newly arriving IPIs. In this mode, one vCPU of the virtual machine may send a "soft" IPI to another vCPU of the VM via memory monitoring, without having to execute a VM exit instruction. A soft IPI herein shall refer to a message sent from one vCPU to another vCPU by storing the message in a memory region that may be accessible by both vCPU in the guest mode, without the involvement of an Advanced Programmable Interrupt Controller (APIC) bus. Thus, sending and receiving soft IPIs via memory monitoring may facilitate communication among vCPUs without making a VM exit to the hypervisor.

When the vCPU processing the broadcasted IPI completes the processing of the IPI, the vCPU may communicate to the hypervisor that the vCPU is about to transition from an active state (e.g. processing an IPI) into an idle state. In one implementation, a vCPU in the idle state may perform memory monitoring operations for receiving IPIs and/or detecting newly queued tasks. In other implementations, the hypervisor may quiesce a vCPU in the idle state. Quiescing the vCPU causes it to transition to a low power consumption state, thus improving the overall power efficiency of the system. Responsive to determining that all vCPUs of the virtual machine has entered the idle state, the hypervisor may cause all vCPUs to exit the guest execution mode. In an illustrative example, when the last active vCPU of the subset of vCPUs transitions into the idle state, the hypervisor may cause all vCPUs to execute the HLT (halt) instruction, thus forcing the vCPUs to exit to the hypervisor. In certain implementations, the hypervisor may recognize the last active vCPU by inspecting an "Active_CPU" flag indicating that at least one vCPU is in the active state. A set "Active_CPU" flag may indicate that at least one vCPU is in the active state, whereas a cleared "Active_CPU" flag may indicate that no vCPU is in the active state.

Upon preempting a thread implementing a vCPU, the hypervisor may, for example, schedule on the same physical CPU a thread implementing another vCPU.

Thus, the systems and methods described herein represent improvements to the functionality of general purpose or specialized computing devices, by implementing IPI handling methods that reduce virtualization-related overhead and enable CPU-overcommitted environment. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

Figure 1:
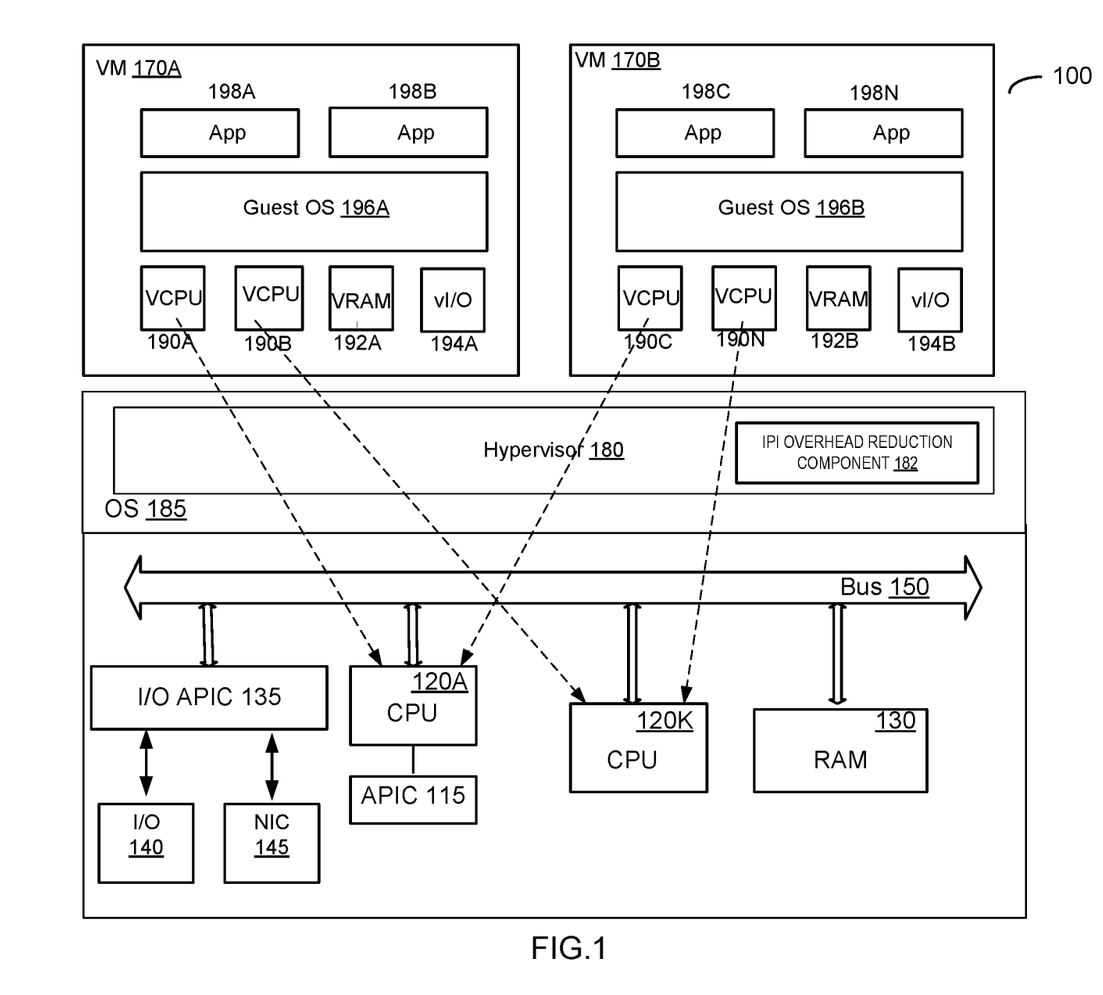
FIG. 1 depicts a high-level component diagram of an illustrative example of a computer system 100 operating in accordance with one or more aspects of the present disclosure.

FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

Examples of "processors" (also referred herein as "processing devices" or CPUs) include various devices that are capable of executing instructions encoding arithmetic, logical, or I/O operations. In an illustrative example, a processor may follow Von Neumann architectural model and may include an arithmetic logic unit (ALU), a control unit, and a plurality of registers. In another aspect, a processor may be a single core processor which is capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Examples of "memory devices" include volatile or non-volatile memory devices, such as RAM, ROM, EEPROM, or any other devices capable of storing data. Examples of "I/O devices" include devices providing an interface between a processor and an external device capable of inputting and/or outputting binary data.

Computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., I/O devices connected to an I/O APIC), as well as inter-processor interrupts (IPIs).

Certain processor architectures support inter-processor interrupts (IPI) to provide a mechanism to interrupt another processor or group of processors on the system bus. IPIs may be used for software self-interrupts, interrupt forwarding, Transaction Lookaside Buffer (TLB) shutdown, or preemptive scheduling. In an illustrative example, a processor may generate IPIs by programming the interrupt command register (ICR) in its local APIC. Writing to the ICR causes an IPI message to be generated and issued on the system bus or on the APIC bus. IPIs may be sent to other processors in the system or to the originating processor (self-interrupts). The information written into the ICR includes the type of IPI message to be sent and the destination processor identifier. When the destination processor receives an IPI message, its local APIC processes the message using the information included in the message (such as vector number and trigger mode).

Computer system 100 may run one or more virtual machines 170A-170B, by executing a virtual machine manager 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors 120, memory 130, and I/O devices 140, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194. A number of vCPUs 190 from different virtual machines may be mapped to one processor 120. One or more guest applications 198A-198N may be running on a virtual machine 170 under a guest operating system 196. Guest operating system and guest applications are collectively referred to herein as "guest software."

In certain implementations, processor virtualization may be implemented by the hypervisor scheduling time slots on one or more physical processors for virtual processors. In an illustrative example, a virtual processor may be implemented by a processing thread that may be scheduled to run on one of the host physical processors.

Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implemented by a paging mechanism allocating the host RAM to virtual machine memory pages and swapping the memory pages to a backing storage when necessary.

Various IPI handling functions may be performed by an IPI handling component 182 running on host computer system 100 and operating in accordance with one or more aspects of the present disclosure. In certain implementations, IPI overhead reduction component 182 may be implemented as a software component invoked by hypervisor 180. Alternatively, functions of IPI overhead reduction component 182 may be performed by hypervisor 180.

Figure 2:
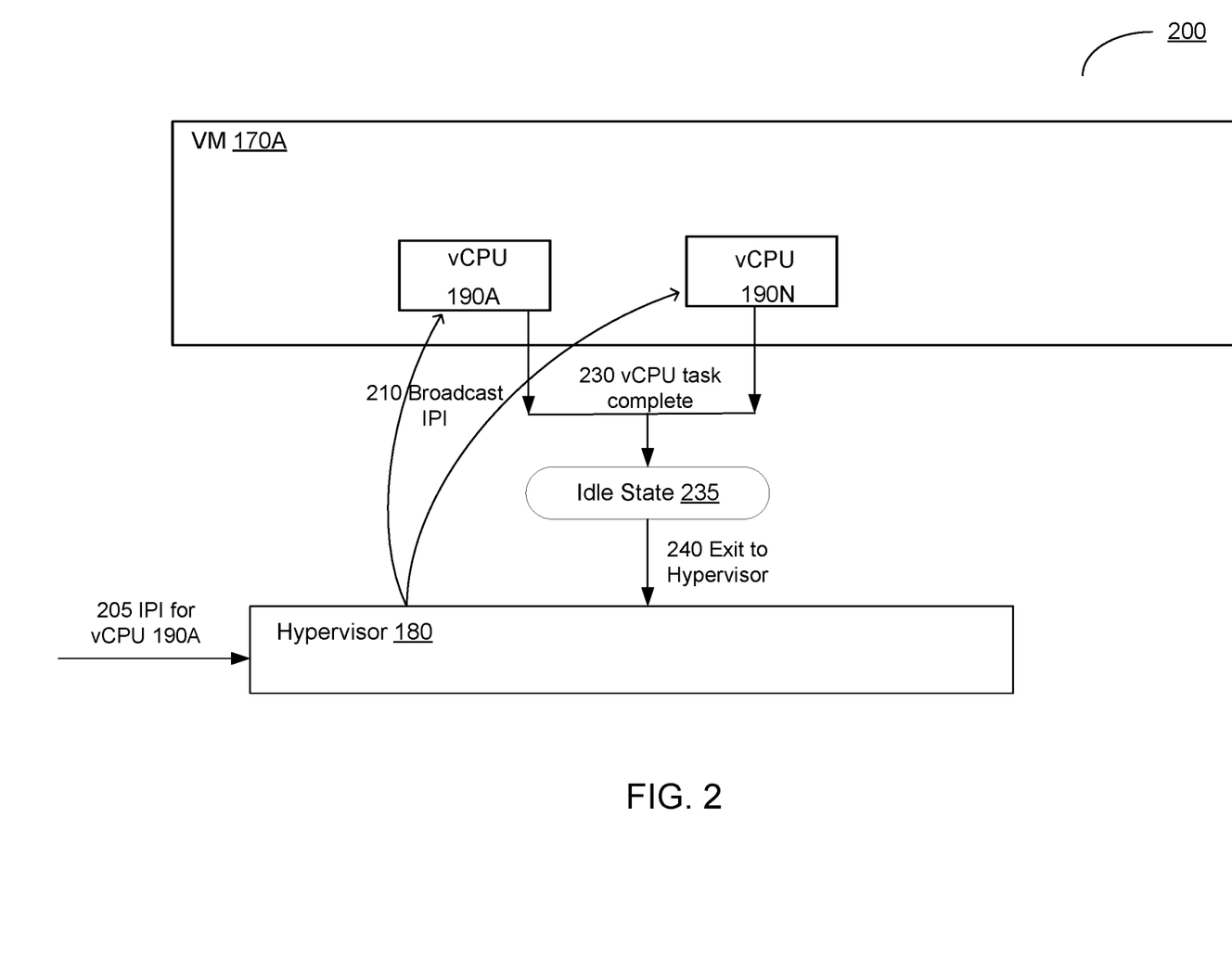
FIG. 2 is a sequence diagram illustrating the flow of events of an example method of reducing IPI overhead via IPI broadcast in accordance with one or more aspects of the present disclosure.

FIG. 2 is a sequence diagram illustrating the flow of events of an example method of reducing IPI overhead in accordance with one or more aspects of the present disclosure. In certain implementations, each vCPU 190A-190N may be implemented by a respective processing thread that may be scheduled to one of the host CPUs 120A-120K of FIG. 1. In an illustrative example, at operation 205 the hypervisor 180 may detect an IPI received by a physical processor of the host computer and addressed to a vCPU of a virtual machine running on the host computer system (e.g., vCPU 190A of VM 170A). Subsequently, the hypervisor 180, at operation 210, may broadcast the IPI to at least a subset of vCPUs of the VM170A (e.g., vCPU 190A and vCPU 190N). The subset of vCPUs may be constructed to include two or more vCPUs frequently communicating with each other. In an illustrative example, the hypervisor may include into the subset any vCPU that has sent, to other vCPUs within the subset, an IPI traffic volume exceeding a predetermined threshold. In certain implementations, the hypervisor may periodically measure the amount of IPI traffic between the vCPUs of a given virtual machine and may accordingly modify the subset of vCPUs to receive the IPI broadcast. In another illustrative example, the hypervisor may initialize the plurality of the virtual processors with an empty set of virtual processors. The hypervisor may then measure IPI traffic volume among the virtual processors of the virtual machine, and may include, into the plurality of the virtual processors, two or more virtual processors that have sent, to each other, an IPI traffic volume exceeding a predetermined threshold. Alternatively, the hypervisor may send the IPI to all vCPUs of the VM170A.

Sending the IPI to at least a subset of vCPUs of VM 170A would wake up all these vCPUs. While at least one vCPU of the subset of the vCPUs running in an active state, the hypervisor may prevent the other vCPUs from exiting to the hypervisor, thus forcing all the vCPUs to remain in the guest execution mode. While in the guest execution mode, each vCPU may perform memory monitoring (e.g., using x86-64 MONITOR/MWAIT instructions, their analogs on other execution platforms, or other memory access instructions) in order to receive notifications of newly arriving IPIs. In one implementation, in order to enable memory monitoring by vCPUs, the hypervisor 180 may configure the VMCS of VM170A to allow the virtual machine to execute MONITOR/MWAIT instructions (or other memory access instructions) without causing a VM exit.

When vCPU 190A completes processing of the IPI, at operation 230, vCPU 190A may communicate to the hypervisor that it is about to transition from an active state (e.g. processing an IPI) into idle state 235. In certain implementation, the hypervisor may quiesce a vCPU in the idle state. Quiescing the vCPU causes it to transition to a low power consumption state, thus improving the overall power efficiency of the system. In one implementation, the hypervisor then may maintain in its memory an Active_CPU flag which, when set, indicates that at least one vCPU is in the active state. If at least one vCPU is running in the active state (e.g. performing a task), the hypervisor 180 may allow other vCPUs 190A-N to continue to operate in the guest execution mode, for example by transitioning into memory monitoring state (e.g., by executing the MONITOR/MWAIT instructions or other memory access instructions).

Alternatively, responsive to detecting that all vCPUs of the VM 170 are running in the idle state 235 (e.g. the Active_CPU flag is cleared), the hypervisor may cause each of vCPUs 190A-N of VM 170A to exit the guest execution mode by executing a HLT instruction which would cause VM exit at operation 240. Upon preempting a thread implementing a vCPU, the hypervisor may, for example, schedule on the same physical CPU a thread implementing another vCPU.

In certain implementation, when hypervisor 180 broadcasts the IPI to a subset of vCPUs of VM 170A, hypervisor 180 may periodically measure the amount of IPI traffic between the vCPUs of a given virtual machine and may accordingly modify the subset of vCPUs to receive the IPI broadcast. Alternatively, the hypervisor may send the IPI to all vCPUs of the VM170A. Because vCPUs within the subset send and receive IPIs to each other via shared memory regions, hypervisor 180 may not be notified when IPIs are sent and received between the vCPUs in the subset, thus may not be able to measure the IPI traffic among the vCPUs. Accordingly, hypervisor 180 may temporarily disable the IPI broadcasting feature and revert back to the traditional method of sending an IPI to one vCPU for processing. When the vCPUs of a given VM are not running within a subset, they may send and receive IPIs to each other via the APIC bus of the host system, which may be detected and measured by hypervisor 180. Hypervisor 180 may then instantiate a new subset for VM 170A based on the measured IPI traffic the vCPUs of VM 170A.

Figure 3:
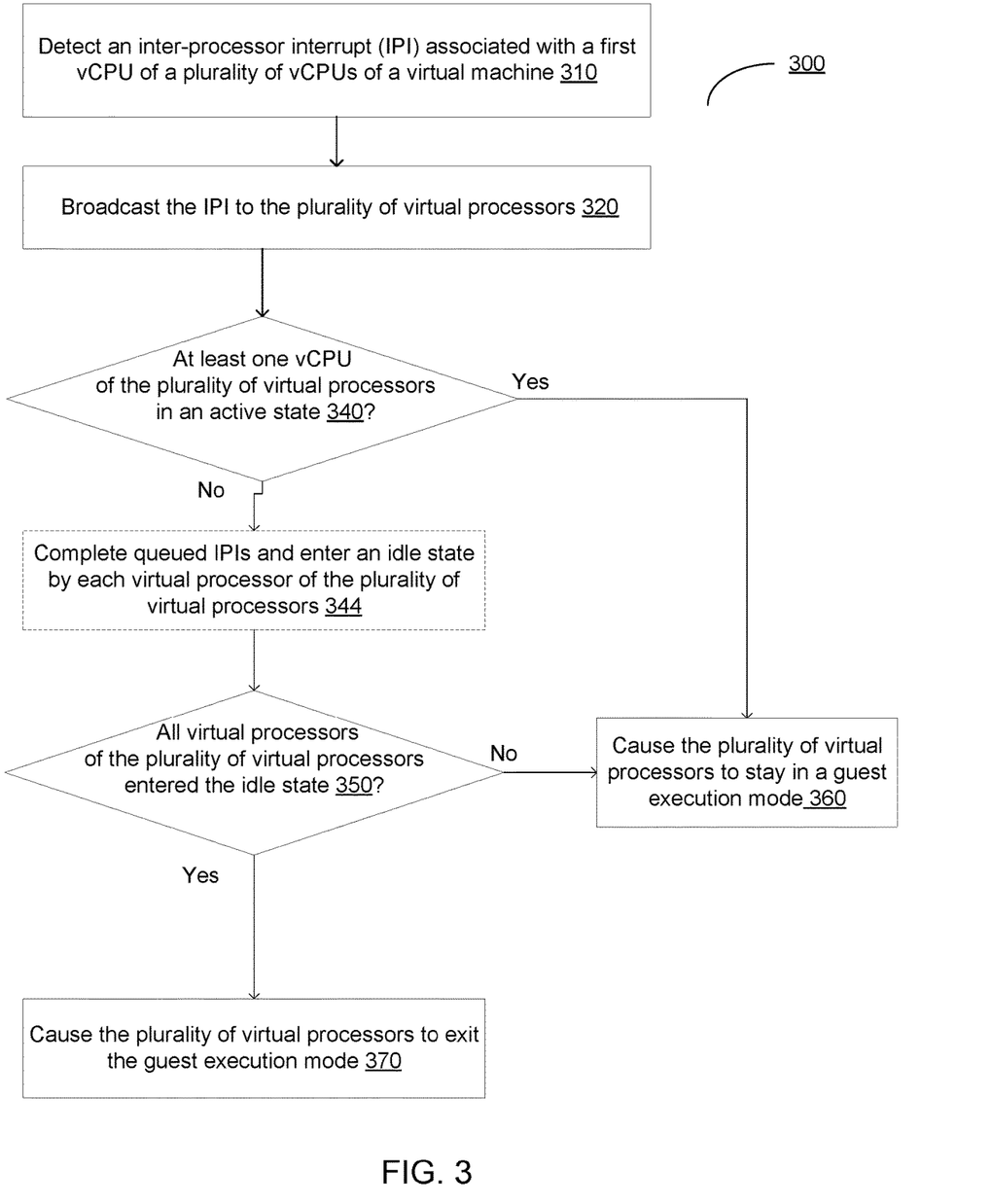
FIG. 3 is a flow diagram of an example method of reducing IPI overhead with overcommit support via IPI broadcast, in accordance with one or more aspects of the present disclosure.

FIG. 3 is a flow diagram of an example method of reducing IPI overhead with overcommit support, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 500-600 of FIGS. 5-6) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Referring to FIG. 3, at block 310, a hypervisor of the host computer system implementing the method may detect an IPI associated with a first vCPU of a plurality of vCPUs of a virtual machine by mapping the physical processor that received the IPI from the APIC bus of the host system, to the first vCPU of the running virtual machine, as described in more detail herein above.

At block 320, the hypervisor may broadcast the IPI to the plurality of virtual processors of the virtual machine, thus causing the plurality of virtual processors to enter a guest execution mode. Alternatively, the hypervisor may multicast the IPI to a subset of the plurality of the virtual processors that include the first virtual processor and other virtual processors of the virtual machine sending or receiving IPIs to the first virtual processor, as described in more detail herein above. In this example, multicasting the IPI may cause the IPI to be sent to a subset of the virtual processors in an environment, whereas broadcasting the IPI may cause the IPI to be sent to all virtual processors in the environment. In yet another implementation, the hypervisor may send the IPI to the plurality of virtual processors via unicasting the IPI to each virtual processor individually.

At block 340, the hypervisor may check whether at least one vCPU of the plurality of vCPUs is in an active state. A vCPU may be in the active state if the vCPU is performing a task or executing an IPI, as described in more detail herein above.

Responsive to determining, at block 360, that at least one vCPU is in the active state, the hypervisor may cause the plurality of virtual processors to stay in a guest execution mode, for example by quiescing the vCPUs of the virtual machine. Responsive to determining, at block 344, that no vCPU is in the active state, the hypervisor may cause the vCPUs to execute memory monitoring instructions to detect and execute queued IPIs, as described in more details herein above.

At block 350, the hypervisor may check whether all the virtual processors of the plurality of the virtual processors entered an idle state. In an illustrative example, the hypervisor may determine that all virtual processors have entered the idle state by inspecting an Active_CPU flag of the VM that may indicate whether at least one vCPU is in the active state, as described in more details herein above.

Responsive to determining, at block 360, that at least one virtual processor is in the active state, the hypervisor may cause the plurality of virtual processors to stay in a guest execution mode, for example by quiescing the virtual processors of the virtual machine. Responsive to determining, at block 370, that all of the virtual processors are in the idle state, the hypervisor may cause the virtual processors to exit the guest execution mode, for example by executing the HLT (halt) instruction, thus forcing the vCPUs to exit to the hypervisor, as described in more details herein above. Responsive to completing the operations of block 370, the method may terminate.

Figure 4:
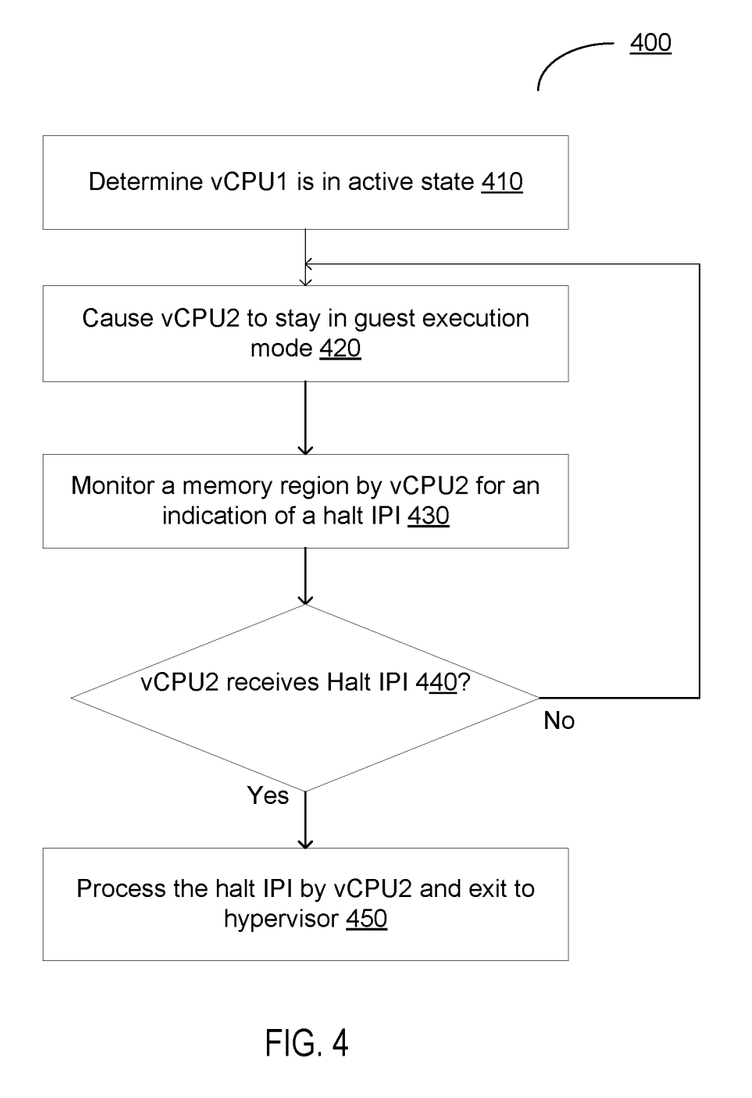
FIG. 4 is a flow diagram of another example method of reducing IPI overhead with overcommit support via IPI broadcast, in accordance with one or more aspects of the present disclosure.

FIG. 4 is a flow diagram of another example method of reducing IPI overhead with overcommit support via IPI broadcast, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500-600 of FIGS. 5-6) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Referring to FIG. 4, at block 410, a hypervisor of the host computer system implementing the method may determine that a virtual processor vCPU1 of a virtual machine running on a physical processor is in an active state, e.g. executing an IPI. In one implementation, a vCPU may be in the active state if the vCPU is performing a task or executing an IPI, as described in more detail herein above.

At block 420, the hypervisor may detect vCPU2 of the same virtual machine as vCPU1, and consequently may cause vCPU2 to stay in the guest execution mode. While in the guest execution mode, vCPU2 may perform memory monitoring instructions, e.g. by configuring the VMCS of the virtual machine to allow the virtual machine to execute MONITOR/MWAIT instructions (or other memory access instructions) without causing a VM exit, as described in more detail herein above.

At block 430, vCPU2 may monitor a memory region for an indication of an IPI from vCPU1, indicating that vCPU1 is no longer in the active state. vCPU2 may then execute a halt instruction to exit to the hypervisor. In certain implementations, vCPU1 may send an IPI to vCPU2 via a shared memory region, as described in more detail herein above.

At block 440, responsive to vCPU2 receiving the IPI from vCPU1, vCPU2 may execute a halt instruction, thus exiting the guest execution mode. In an illustrative example, the hypervisor may schedule on the same physical CPU a thread implementing another vCPU, as described in more detail herein above. Responsive to completing the operations of block 450, the method may terminate.

Figure 5:
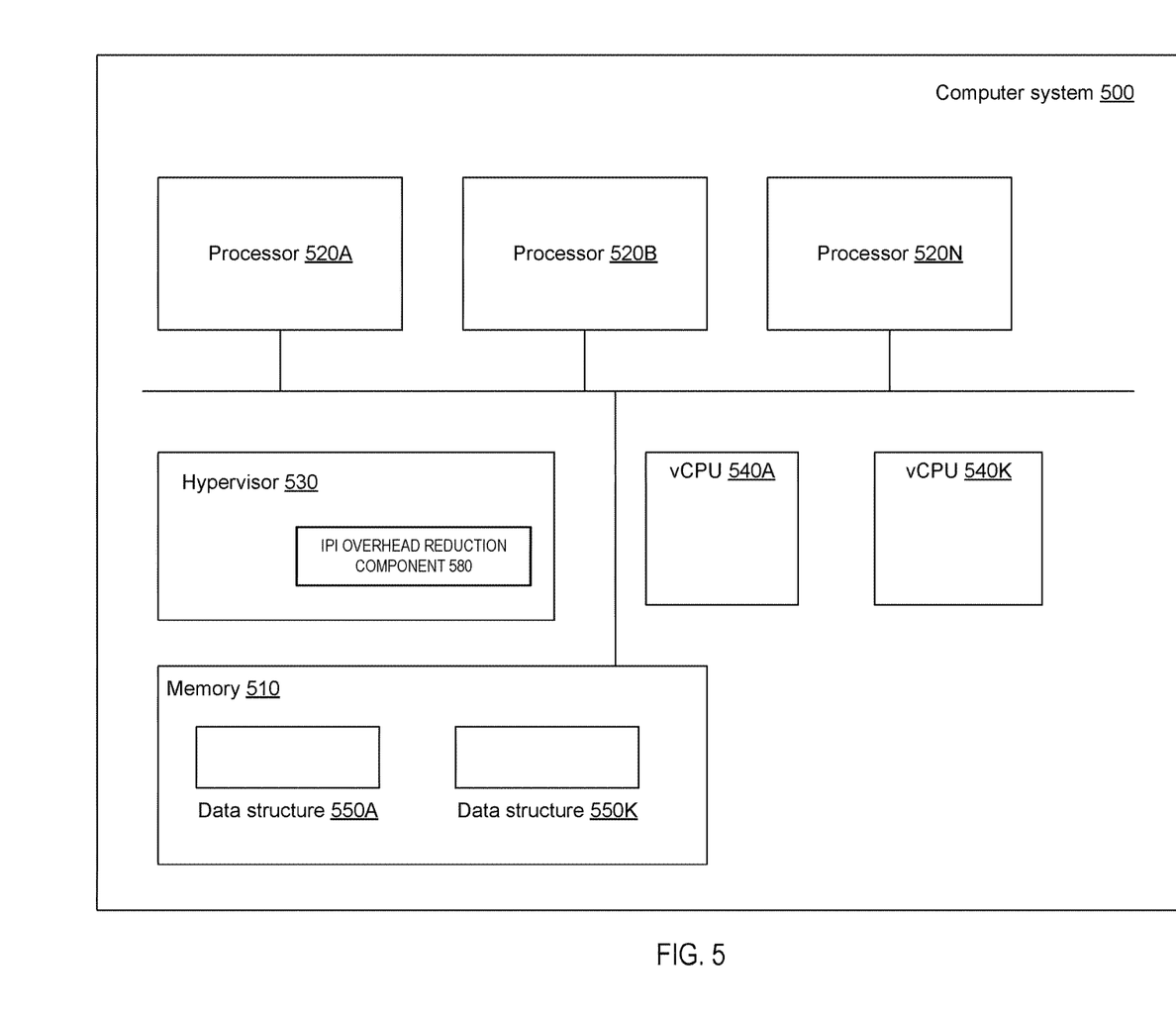
FIG. 5 depicts a block diagram of an illustrative computer system operating in accordance with one or more aspects of the disclosure.

FIG. 5 depicts a block diagram of an illustrative computer system 500 operating in accordance with one or more aspects of the disclosure. In various illustrative examples, computer system 500 may be represented by computer system 100 of FIG. 1. Computer system 500 comprises a memory 510 and one or more physical processors 520A-520N, that are operatively coupled to the memory 510 and executes code implementing hypervisor 530 and processing threads implementing virtual processors 540A-540K. The memory may store per-vCPU data structures 550A-550K to store memory monitoring objects. The hypervisor may include an IPI overhead reduction component 580 operating in accordance with one or more aspects of the present disclosure. In an illustrative example, IPI overhead reduction component 580 may implement methods 300 and/or 400 of FIGS. 3-4.

Figure 6:
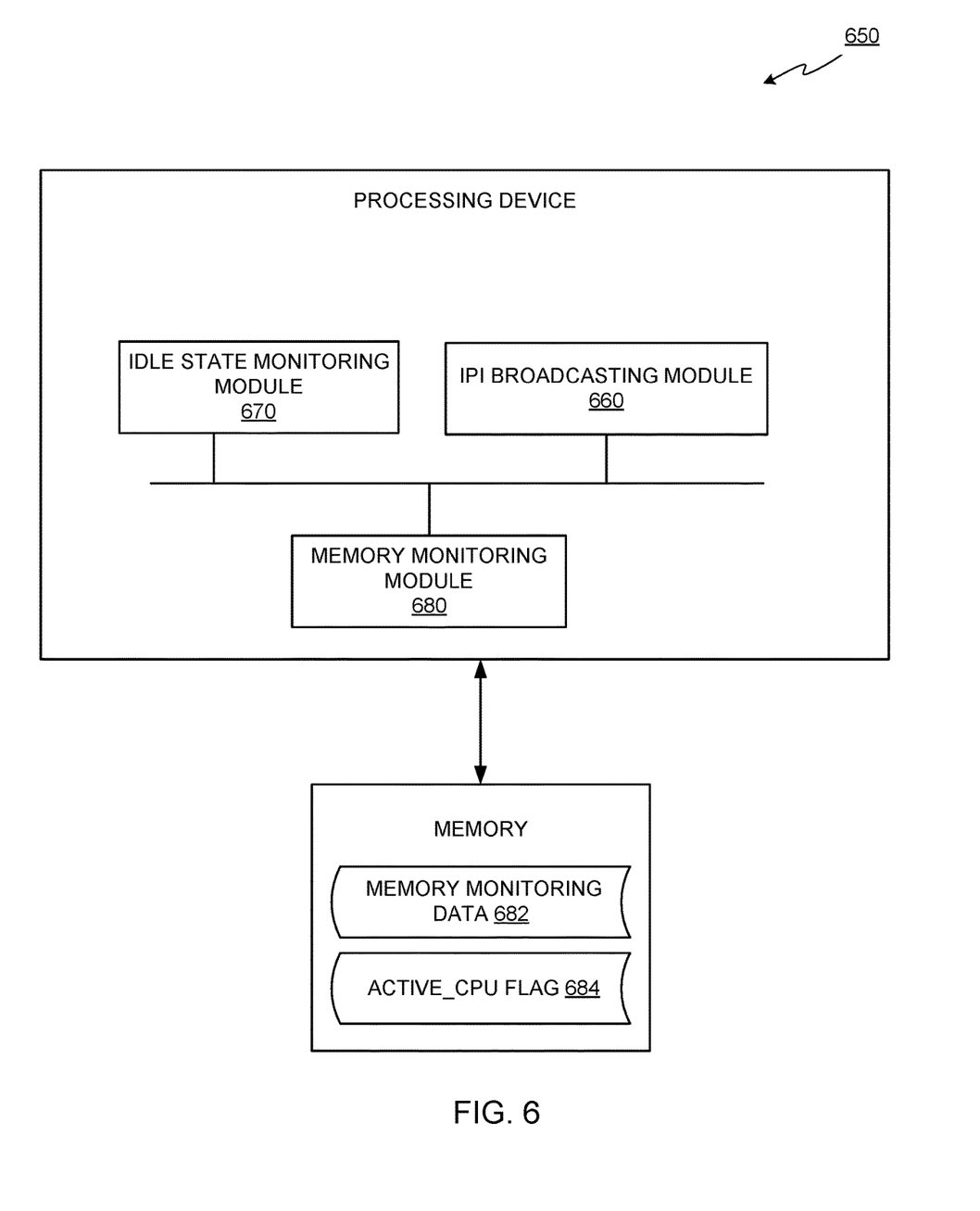
FIG. 6 depicts a block diagram of an apparatus in accordance with one or more aspects of the present disclosure.

FIG. 6 depicts a block diagram of an apparatus 650 operating in accordance with one or more aspects of the present disclosure. Apparatus 650 may include one or more processing devices and one or more memory devices. In the example shown, apparatus 650 may include an IPI broadcasting module 660, an idle state monitoring module 670, and a memory monitoring module 680.

IPI broadcasting module 660 may enable processing device to broadcast the IPI to the plurality of virtual processors of the virtual machine, thus causing the plurality of virtual processors to enter a guest execution mode. Alternatively, processing device may multicast the IPI to a subset of the plurality of the virtual processors that include the first virtual processor and other virtual processors of the virtual machine sending or receiving IPIs to the first virtual processor, as described in more detail herein above.

Idle state monitoring module 670 may enable processing device to force the plurality of the virtual processors to remain in a guest execution mode while at least one virtual processor of the plurality of virtual processors is running in an active state. In an illustrative example, when the last active virtual processor of the plurality of virtual processors transitions into the idle state, processing device may cause all virtual processors to execute the HLT (halt) instruction to exit to the hypervisor. In certain implementations, processing device may recognize the last active virtual processor by inspecting Active_CPU flag 684, as described in more details herein above.

Memory monitoring module 680 may enable processing device to send and receive IPI among vCPUs without making a VM exit to the hypervisor. In one implementation, while in the guest execution mode, each vCPU may perform memory monitoring (e.g., using x86-64 MONITOR/MWAIT instructions, their analogs on other execution platforms, or other memory access instructions) in order to receive notifications of newly arriving IPIs. Processing device may use memory monitoring data 682 to store memory monitoring objects, as described in more details herein above.

Figure 7:
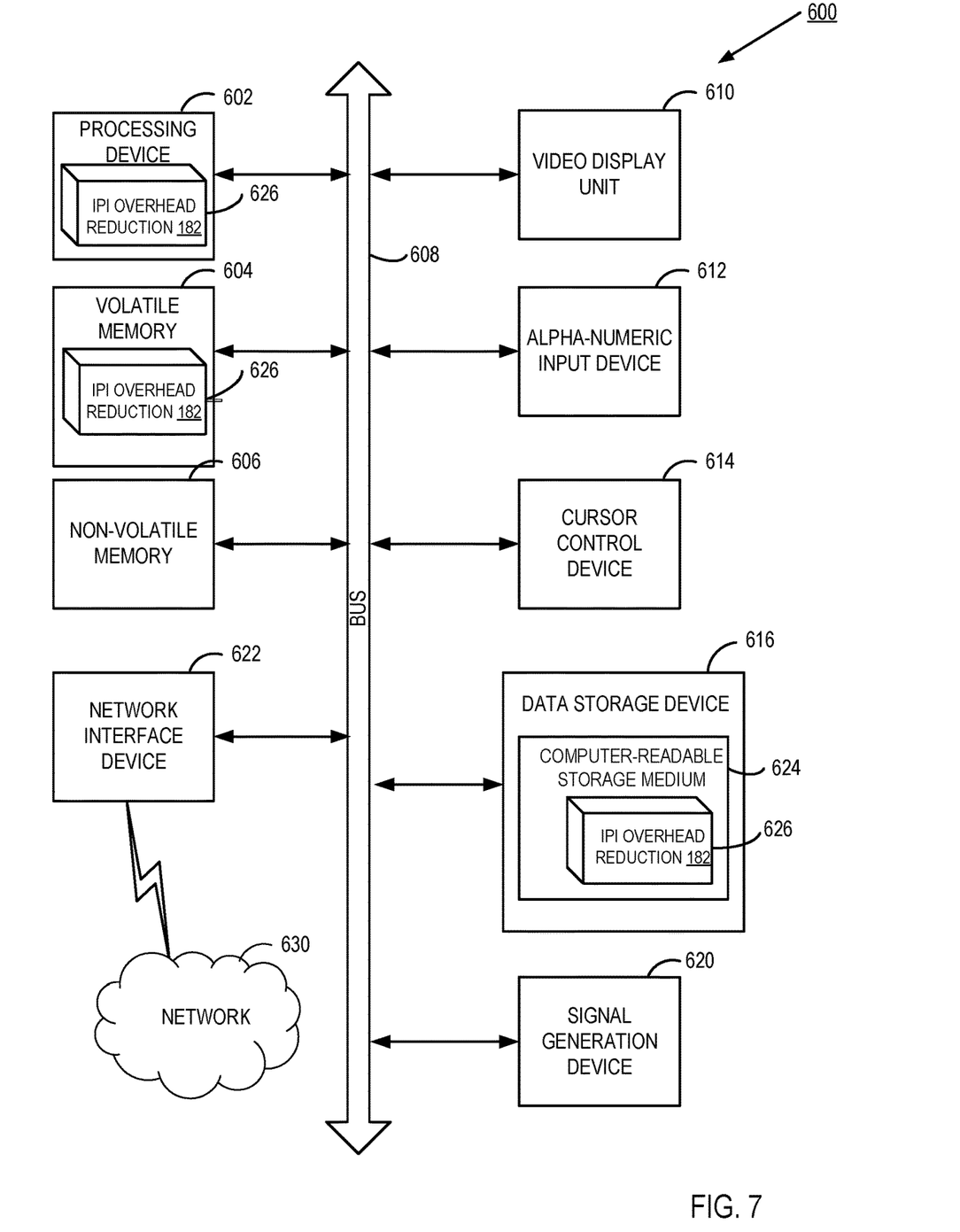
FIG. 7 depicts a block diagram of another illustrative computing device operating in accordance with one or more aspects of the disclosure.

FIG. 7 depicts a block diagram of another illustrative computer system 600 operating in accordance with one or more aspects of the disclosure. In various illustrative examples, computer system 600 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network 630, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300-400 of FIGS. 3-4.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: detecting, by a hypervisor of a host computer system, an inter-processor interrupt (IPI) associated with a first virtual processor of a plurality of virtual processors of a virtual machine running on the host computer system; sending the IPI to the plurality of virtual processors; responsive to determining that at least one virtual processor of the plurality of virtual processors is in an active state, causing the plurality of virtual processors to stay in a guest execution mode; and responsive to determining that all virtual processors of the plurality of virtual processors entered an idle state, causing the plurality of virtual processors to exit the guest execution mode.

Example 2 is a method of example 1, wherein entering the idle state by a virtual processor comprises quiescing the virtual processor.

Example 3 is a method of example 1, wherein the plurality of virtual processors of the virtual machine comprises a virtual processor that has sent, to other virtual processors of the plurality of virtual processors, an IPI traffic volume exceeding a predetermined threshold.

Example 4 is a method of example 1, further comprising: initializing the plurality of the virtual processors with an empty set; measuring IPI traffic volume among the virtual processors of the virtual machine; and including, into the plurality of the virtual processors, two or more virtual processors that have sent, to each other, an IPI traffic volume exceeding a predetermined threshold.

Example 5 is a method of example 1, wherein the IPI comprises at least one of a soft IPI sent via a shared memory region accessible to the plurality of virtual processors, or an IPI sent via an APIC bus.

Example 6 is a method of example 1, further comprising: executing, by a virtual processor of the plurality of virtual processors, a memory monitoring instruction to monitor modifications of a certain memory region.

Example 7 is a method of example 1, wherein the sending the IPI to the plurality of virtual processors comprises sending at least one of a multicast IPI message, a broadcast IPI message, or a plurality of unicast IPI messages to the plurality of virtual processors.

Example 8 is a method of example 1, wherein causing the plurality of the virtual processors to exit the guest mode comprises: detecting that a last active virtual processor of the plurality of the virtual processors has transitioned to the idle state; and sending an IPI to the plurality of virtual processors causing the virtual processors to execute a halt instruction.

Example 9 is a system comprising: a memory; and a processing device operatively coupled to the memory, the processing device to cause a hypervisor of a host computer system to: detect an inter-processor interrupt (IPI) associated with a first virtual processor of a plurality of virtual processors of a virtual machine running on the host computer system; send the IPI to the plurality of virtual processors; responsive to determining that at least one virtual processor of the plurality of virtual processors is in an active state, cause the plurality of virtual processors to stay in a guest execution mode; and responsive to determining that all virtual processors of the plurality of virtual processors entered an idle state, cause the plurality of virtual processors to exit the guest execution mode.

Example 10 is a system of example 9, wherein to enter the idle state by a virtual processor, the hypervisor to quiesce the virtual processor.

Example 11 is a system of example 9, wherein the plurality of virtual processors of the virtual machine comprises a virtual processor that has sent, to other virtual processors of the plurality of virtual processors, an IPI traffic volume exceeding a predetermined threshold.

Example 12 is a system of example 11, wherein the hypervisor is further to: initialize the plurality of the virtual processors with an empty set; measure IPI traffic volume among the virtual processors of the virtual machine; and include, into the plurality of the virtual processors, two or more virtual processors that have sent, to each other, an IPI traffic volume exceeding a predetermined threshold.

Example 13 is a system of example 9, wherein the IPI comprises at least one of a soft IPI sent via a shared memory region accessible to the plurality of virtual processors, or an IPI sent via an APIC bus.

Example 14 is a system of example 9, wherein a virtual processor in the guest execution mode to execute a memory monitoring instruction to monitor modifications of a certain memory region.

Example 15 is a system of example 9, wherein to cause the plurality of the virtual processors to exit the guest mode, the hypervisor to: detect that a last active virtual processor of the plurality of the virtual processors has transitioned to the idle state; and send an IPI to the plurality of virtual processors causing the virtual processors to execute a halt instruction.

Example 16 is a system of example 9, wherein to send the IPI to the plurality of virtual processors, the hypervisor to send at least one of a multicast IPI message, a broadcast IPI message, or a plurality of unicast IPI messages to the plurality of virtual processors.

Example 17 is a non-transitory computer-readable storage medium comprising executable instructions that, when executed by a processing device, cause the processing device to: receive, from an APIC bus of a host computer system, an IPI associated with a virtual processor of a plurality of virtual processors of a virtual machine running on the host computer system; broadcast the IPI to the plurality of virtual processors; responsive to determining that at least one virtual processor of the plurality of virtual processors is in an active state, cause the plurality of virtual processors to stay in a guest execution mode; and responsive to determining that all virtual processors of the plurality of virtual processors entered an idle state, cause the plurality of virtual processors to exit the guest execution mode.

Example 18 is a non-transitory computer-readable storage medium of example 17, wherein a virtual processor in the guest execution mode to execute a memory monitoring instruction to monitor modifications of a certain memory region, and wherein the memory monitoring instruction comprises MONITOR/MWAIT instructions.

Example 19 is a non-transitory computer-readable storage medium of example 17, wherein the IPI comprises at least one of a soft IPI sent via a shared memory region accessible to the plurality of virtual processors, or a hardware IPI generated by the hardware of the host system and sent via an APIC bus.

Example 20 is a non-transitory computer-readable storage medium of example 17, wherein to exit the guest execution mode, a virtual processor to execute a halt instruction.

Example 21 is an electronic device, comprising: a memory; a processing device coupled to memory, the processing device executing a hypervisor to: receive, from an APIC bus of a host computer system, an IPI associated with a virtual processor of a plurality of virtual processors of a virtual machine running on the host computer system; broadcast the IPI to the plurality of virtual processors; responsive to determining that at least one virtual processor of the plurality of virtual processors is in an active state, cause the plurality of virtual processors to stay in a guest execution mode; and responsive to determining that all virtual processors of the plurality of virtual processors entered an idle state, cause the plurality of virtual processors to exit the guest execution mode.

Example 22 is an electronic device of example 21, wherein to enter the idle state by a virtual processor, the hypervisor to quiesce the virtual processor.

Example 23 is an electronic device of example 21, wherein the plurality of virtual processors of the virtual machine comprises a virtual processor that has sent, to other virtual processors of the plurality of virtual processors, an IPI traffic volume exceeding a predetermined threshold.

Example 24 is an electronic device of example 23, wherein the hypervisor is further to: initialize the plurality of the virtual processors with an empty set; measure IPI traffic volume among the virtual processors of the virtual machine; and include, into the plurality of the virtual processors, two or more virtual processors that have sent, to each other, an IPI traffic volume exceeding a predetermined threshold.

Example 25 is an electronic device of example 21, wherein the IPI comprises at least one of a soft IPI sent via a shared memory region accessible to the plurality of virtual processors, or an IPI sent via an APIC bus.

Example 26 is an electronic device of example 21, wherein a virtual processor in the guest execution mode to execute a memory monitoring instruction to monitor modifications of a certain memory region.

Example 27 is an electronic device of example 21, wherein to cause the plurality of the virtual processors to exit the guest mode, the hypervisor to: detect that a last active virtual processor of the plurality of the virtual processors has transitioned to the idle state; and send an IPI to the plurality of virtual processors causing the virtual processors to execute a halt instruction.

Example 28 is an electronic device of example 21, wherein to send the IPI to the plurality of virtual processors, the hypervisor to send at least one of a multicast IPI message, a broadcast IPI message, or a plurality of unicast IPI messages to the plurality of virtual processors.

Example 29 is a method comprising: receiving, from an APIC bus of a host computer system, an IPI associated with a virtual processor of a plurality of virtual processors of a virtual machine running on a host computer system; broadcasting the IPI to the plurality of virtual processors; responsive to determining that at least one virtual processor of the plurality of virtual processors is in an active state, cause the plurality of virtual processors to stay in a guest execution mode; and responsive to determining that all virtual processors of the plurality of virtual processors entered an idle state, cause the plurality of virtual processors to exit the guest execution mode.

Example 30 is a method of example 29, wherein a virtual processor in the guest execution mode to execute a memory monitoring instruction to monitor modifications of a certain memory region, and wherein the memory monitoring instruction comprises MONITOR/MWAIT instructions.

Example 31 is a method of example 29, wherein the IPI comprises at least one of a soft IPI sent via a shared memory region accessible to the plurality of virtual processors, or a hardware IPI generated by the hardware of the host system and sent via an APIC bus.

Example 32 is a method of example 29, wherein to exit the guest execution mode, a virtual processor to execute a halt instruction.

Example 33 is a method of example 29, wherein the IPI is received from the APIC bus by a physical processor associated with the virtual processor.

Example 34 is an apparatus comprising: a means to detect, by a processing device, an inter-processor interrupt (WI) associated with a first virtual processor of a plurality of virtual processors of a virtual machine running on a host computer system; a means to send the WI to the plurality of virtual processors; responsive to determining that at least one virtual processor of the plurality of virtual processors is in an active state, a means to cause the plurality of virtual processors to stay in a guest execution mode; and responsive to determining that all virtual processors of the plurality of virtual processors entered an idle state, a means to cause the plurality of virtual processors to exit the guest execution mode.

Example 35 is an apparatus of example 34, wherein the plurality of virtual processors of the virtual machine comprises a virtual processor that has sent, to other virtual processors of the plurality of virtual processors, an IPI traffic volume exceeding a predetermined threshold.

Example 36 is an apparatus of example 34 further comprising: a means to initialize the plurality of the virtual processors with an empty set; a means to measure IPI traffic volume among the virtual processors of the virtual machine; and a means to include, into the plurality of the virtual processors, two or more virtual processors that have sent, to each other, an IPI traffic volume exceeding a predetermined threshold.

Example 37 is an apparatus of example 34, wherein the IPI comprises at least one of a soft IPI sent via a shared memory region accessible to the plurality of virtual processors, or an IPI sent via an APIC bus.

Example 38 is an apparatus of example 34 further comprising a means to execute, by a virtual processor in the guest execution mode, a memory monitoring instruction to monitor modifications of a certain memory region.

Example 39 is an apparatus of example 34, wherein the means to cause the plurality of the virtual processors to exit the guest mode further comprises: a means to detect that a last active virtual processor of the plurality of the virtual processors has transitioned to the idle state; and a means to send an IPI to the plurality of virtual processors causing the virtual processors to execute a halt instruction.

Example 40 is an apparatus of example 34, wherein the means to send the IPI to the plurality of virtual processors further comprises a means to send at least one of a multicast IPI message, a broadcast IPI message, or a plurality of unicast IPI messages to the plurality of virtual processors.

What is claimed is:

1. A method, comprising:
   detecting, by a hypervisor of a host computer system, an inter-processor interrupt (IPI) associated with a first virtual processor of a plurality of virtual processors of a virtual machine running on the host computer system;
   sending the IPI to the plurality of virtual processors;
   determining whether at least one virtual processor of the plurality of virtual processors is in an active state;
   responsive to determining that the at least one virtual processor of the plurality of virtual processors is in the active state, causing the plurality of virtual processors to stay in a guest execution mode;
   determining whether all virtual processors of the plurality of virtual processors entered an idle state; and
   responsive to determining that all virtual processors of the plurality of virtual processors entered the idle state, causing the plurality of virtual processors to exit the guest execution mode.

2. The method of claim 1, wherein entering the idle state by a virtual processor comprises quiescing the virtual processor.

3. The method of claim 1, wherein the plurality of virtual processors of the virtual machine comprises a virtual processor that has sent, to other virtual processors of the plurality of virtual processors, an IPI traffic volume exceeding a predetermined threshold.

4. The method of claim 1, further comprising:
   initializing the plurality of the virtual processors with an empty set;
   measuring IPI traffic volume among the virtual processors of the virtual machine; and
   including, into the plurality of the virtual processors, two or more virtual processors that have sent, to each other, an IPI traffic volume exceeding a predetermined threshold.

5. The method of claim 1, wherein the IPI comprises at least one of a soft IPI sent via a shared memory region accessible to the plurality of virtual processors, or an IPI sent via an APIC bus.

6. The method of claim 1, further comprising:
   executing, by a virtual processor of the plurality of virtual processors, a memory monitoring instruction to monitor modifications of a certain memory region.

7. The method of claim 1, wherein the sending the IPI to the plurality of virtual processors comprises sending at least one of a multicast IPI message, a broadcast IPI message, or a plurality of unicast IPI messages to the plurality of virtual processors.

8. The method of claim 1, wherein causing the plurality of the virtual processors to exit the guest mode comprises:
detecting that a last active virtual processor of the plurality of the virtual processors has transitioned to the idle state; and
sending an IPI to the plurality of virtual processors causing the virtual processors to execute a halt instruction.

9. A system comprising:
a memory; and
a processing device operatively coupled to the memory, the processing device to cause a hypervisor of a host computer system to:
detect an inter-processor interrupt (IPI) associated with a first virtual processor of a plurality of virtual processors of a virtual machine running on the host computer system;
send the IPI to the plurality of virtual processors;
determine whether at least one virtual processor of the plurality of virtual processors is in an active state;
responsive to determining that at least one virtual processor of the plurality of virtual processors is in the active state, cause the plurality of virtual processors to stay in a guest execution mode;
determine whether all virtual processors of the plurality of virtual processors entered an idle state; and
responsive to determining that all virtual processors of the plurality of virtual processors entered the idle state, cause the plurality of virtual processors to exit the guest execution mode.

10. The system of claim 9, wherein to enter the idle state by a virtual processor, the hypervisor is to quiesce the virtual processor.

11. The system of claim 9, wherein the plurality of virtual processors of the virtual machine comprises a virtual processor that has sent, to other virtual processors of the plurality of virtual processors, an IPI traffic volume exceeding a predetermined threshold.

12. The system of claim 11, wherein the hypervisor is further to:
initialize the plurality of the virtual processors with an empty set;
measure IPI traffic volume among the virtual processors of the virtual machine; and
include, into the plurality of the virtual processors, two or more virtual processors that have sent, to each other, an IPI traffic volume exceeding a predetermined threshold.

13. The system of claim 9, wherein the IPI comprises at least one of a soft IPI sent via a shared memory region accessible to the plurality of virtual processors, or an IPI sent via an APIC bus.

14. The system of claim 9, wherein a virtual processor in the guest execution mode is to execute a memory monitoring instruction to monitor modifications of a certain memory region.

15. The system of claim 9, wherein to cause the plurality of the virtual processors to exit the guest mode, the hypervisor is to:
detect that a last active virtual processor of the plurality of the virtual processors has transitioned to the idle state; and
send an IPI to the plurality of virtual processors causing the virtual processors to execute a halt instruction.

16. The system of claim 9, wherein to send the IPI to the plurality of virtual processors, the hypervisor is to send at least one of a multicast IPI message, a broadcast IPI message, or a plurality of unicast IPI messages to the plurality of virtual processors.

17. A non-transitory computer-readable storage medium comprising executable instructions that, when executed by a processing device, cause the processing device to:
receive, from an APIC bus of a host computer system, an IPI associated with a virtual processor of a plurality of virtual processors of a virtual machine running on the host computer system;
broadcast the IPI to the plurality of virtual processors;
determining whether at least one virtual processor of the plurality of virtual processors is in an active state;
responsive to determining that at least one virtual processor of the plurality of virtual processors is in the active state, cause the plurality of virtual processors to stay in a guest execution mode;
determining whether all virtual processors of the plurality of virtual processors entered an idle state; and
responsive to determining that all virtual processors of the plurality of virtual processors entered the idle state, cause the plurality of virtual processors to exit the guest execution mode.

18. The non-transitory computer-readable storage medium of claim 17, wherein a virtual processor in the guest execution mode is to execute a memory monitoring instruction to monitor modifications of a certain memory region, and wherein the memory monitoring instruction comprises MONITOR/MWAIT instructions.

19. The non-transitory computer-readable storage medium of claim 17, wherein the IPI comprises at least one of a soft IPI sent via a shared memory region accessible to the plurality of virtual processors, or a hardware IPI generated by the hardware of the host system and sent via an APIC bus.

20. The non-transitory computer-readable storage medium of claim 17, wherein to exit the guest execution mode, a virtual processor is to execute a halt instruction.

* * * * *